MAGNETIC CORE OCTAL ADDER HAVING NOISE CANCELLING WINDINGS

Filed June 30, 1965

INVENTORS.
OSCAR B. STRAM
SIDNEY N. EINHORN

Joseph P. Kates
ATTORNEY

United States Patent Office 3,351,747

Patented Nov. 7, 1967

3,351,747 MAGNETIC CORE OCTAL ADDER HAVING NOISE CANCELLING WINDINGS

Oscar B. Stram, Paoli, and Sidney N. Einhorn, Willow Grove, Pa., assignors to Burroughs Corporation, Detroit, Mich., a corporation of Michigan Filed June 30, 1965, Ser. No. 468,321

8 Claims. (Cl. 235—175)

ABSTRACT OF THE DISCLOSURE

An octal adder made up of threshold devices, which adder, digit by digit, accepts 7 inputs representing 3 bits of an augend digit, 3 bits of a corresponding addend digit and one bit for the carry which may have resulted from adding the next previous digit of the octal number to provide 4 outputs, 3 for the octal digit sum and one for the possible carry. The octal adder comprises 3 groups of 4 cores each and a carry core to represent the 3-bit outputs and carry of an octal sum digit. Seven current inputs to the cores represent bit values of an augend and addend digit and a previous carry, and these current inputs are applied to leads which are wound on appropriate cores such that a sharply reduced number of cores is required to execute the adding function. Reset and bias inputs and windings and shuttle voltage noise cancelling means to eliminate noise are also provided. The input composites to the cores are connected thereto and output windings are threaded through the cores of each group so as to avoid cascading as well as to provide a sharply reduced number of cores to provide the octal adding function.

Figure 1:
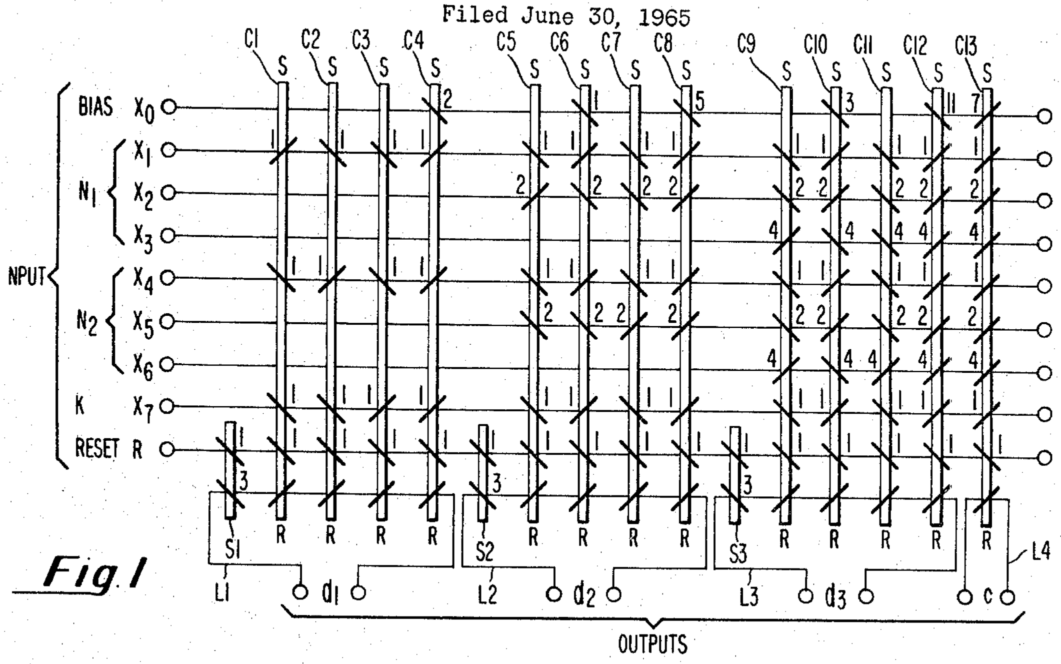

The present invention relates to an octal adder for providing the sum of two octal numbers. More particularly, the present invention relates to an octal adder which provides seven inputs, three for each octal digit of two octal numbers which are added digit by digit, and one for the carry which may have resulted from adding the next previous digit of each of the octal numbers to be added, and which provides four outputs, three for the octal digit sum and one for the carry which may result upon adding the next previous carry and the corresponding digit of each number. A reset winding is also provided and a bias winding is preferably provided. Thereby, the present invention provides an output which is the octal sum of two input octal digits and a carry if present. Thus successively significant octal digits of two octal numbers may be added so that an output octal number results which is the sum of the two input octal numbers.

The circuit of the inventive adder comprises three groups of four function cores each and a single carry core. Each of the four-core groups comprises a circuit for receiving input of the three bits representing an octal digit of a first number and an octal digit of a second number to be added together to provide an output representing one bit of the three bits comprising the corresponding octal sum digit. The single carry core has an output winding to present the carry output if present. The seven input leads (number and carry) are strong collectively through all of the 13 cores provided by the three groups of four cores and the carry core, although each lead is not necessarily strung through each core. One additional input lead introduces the input current representing the bias. A first group of three input leads introduces the current inputs representing the three bits of a digit of the addend. A second group of three input leads introduces the current inputs representing the three bits of the corresponding digit of the augend. An input lead to the cores is provided for the carry of the next previous lesser significant digit bits which were added together. A reset lead which threads all of the cores in the reset direction is provided. A noise canceling core optionally may be provided and if provided it may be incorporated either by providing one noise canceling core for each of the groups of four cores or by providing one noise canceling core (with more windings) for the entire three groups of four cores each. The cores of the inventive device provide a temporary register showing the sum of a digit of one octal number added to the digit of another octal number for a particular one of the digits of the number. The term "digit" is herein defined as meaning the three binary bits necessary to form one octal "digit" in counting eight (octal) counts from zero to seven or successively 000, 001, 010, 011, 100, 101, 110 and 111. Upon resetting the cores this sum may be shifted out to a shift register, digit by digit. The shift register then will show the total accumulated sum. The seven input leads or windings, the bias winding, and the reset winding are applied in parallel to the appropriate cores of all of the groups, the leads comprising the windings which are threaded through each core as required for the logic of the octal add function. A single output lead threads each group of four cores of the three groups and an additional output lead is threaded through the carry core. The bias lead is threaded through the fourth core of the first group, the second and fourth cores of the second group, and the second and fourth cores of the third group and also through the carry core.

Prior art adders employing cores as the active elements have been known, for example, the three-core binary adder described in U.S. Patent 2,696,347 to Arthur W. Lo for "Magnetic Switching Circuit." However, adders employing the cores which are required for operations upon numbers other than numbers of the base two present design problems appreciated and solved by the present invention. For example, normally such adders are formed from combinations of AND and OR gates which lead to employment of too many cores and/or cascading.

Prior art octal adders also had significant disadvantages which the present invention overcomes. Prior octal adders were complex and also required too many cores. Where the prior art octal adders tried to reduce the number of cores such reduction was effected only at the expense of cascading. Cascading imposes unnecessary delay and hence more time is required for the circuit to add. Additionally, prior art devices oftentimes required bipolar readouts to suppress the unwanted truth table states. In most cases prior art octal adders had no noise-eliminating provisions, and if present their provisions to eliminate noise were ineffective. While broadly the thought of a bucking core to balance out the "zero" voltage in a single core is mentioned in U.S. Patent No. 2,769,925 to Norman B. Saunders for "Magnetic Stepping Switches," the present invention employs noise canceling core means in configuration and combination to buck out the cumulative effect of several cores, grouped and also several groups) into which varied inputs are introduced thereby taking care of noise elimination and prevention of false signals for combinations of cores and attendant circuitry and varied combinations of inputs applied in operation.

The present invention overcomes these and other disadvantages of prior art octal adders. It provides a core octal adder which necessitates only a sharply reduced number of cores; yet still it avoids the necessity for cascading. Thus, the inventive core octal adder avoids delay even though it reduces the number of cores. That is, the present invention attains economy and simplicity without time sacrifice. The present invention obtains advantages of parallel operation without the cost which might otherwise be expected from the prior art considerations. Noise and false signals for all practical purposes are substantially eliminated.

Accordingly, an object of the present invention is to provide an octal adder comprising a minimum number of bistable devices such as cores, which do not require cascading to reduce the number of bistable devices required.

Another aim of the present invention is to provide a core octal adder wherein the number of cores is reduced while cascading is avoided.

Another purpose of the present invention is to provide an octal adder comprising a plurality of cores in parallel configuration and arranged in groups together with a core for the carry and wherein the inputs are applied in parallel and the outputs are taken simultaneously and in parallel to reduce time considerations.

Another object of the present invention is to provide an octal adder which will provide simple, yet effective, noise elimination; wherein a sharply reduced number of bistable devices is employed by the adder; and wherein delay is avoided so that economy as well as simplicity are obtained without time sacrifice.

Another aim of the present invention is to provide an octal adder comprising groups of four cores and a single carry core wherein input leads are applied to the cores through inputs which link selected cores of each of the groups and the carry core and wherein outputs are taken simultaneously in parallel from each of the groups of cores and from the carry core by linking output leads and wherein use of bipolar readouts to suppress unwanted truth table states is avoided.

Another purpose of the present invention is to provide a core octal adder and an attendant auxiliary core shuttle-bucker means whereby noise disadvantages are substantially avoided.

Still another object of the invention is to provide an optimum octal adder comprising three inputs for each octal digit to be added and one for the carry and four outputs, three for the octal sum and one for the carry, with an optional logic core collective shuttle voltage elimination feature to provide a simple and cheap, yet advantageously operated, circuit.

Figure 2:
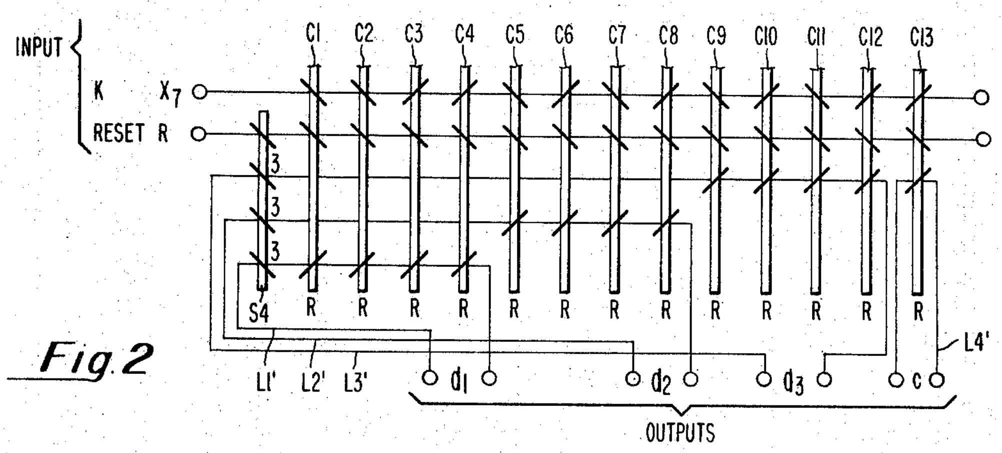
Figure 3:
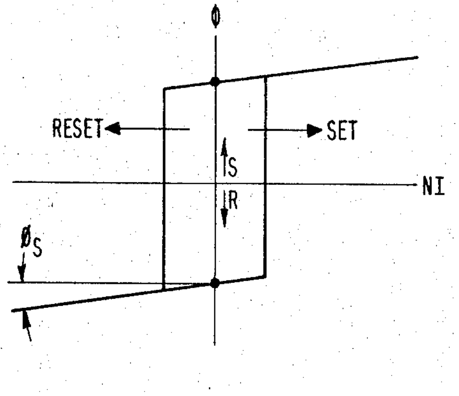

While the novel and distinctive features of the invention are particularly pointed out in the appended claims, a more expository treatment of the invention, in principle and in detail, together with additional objects and advantages thereof, is afforded by the following description and accompanying drawings in which:

FIG. 1 is a schematic diagram of a first embodiment of the octal adder of the invention illustrating in mirror representation the input and output lead winding means, the circuits of the function core groups and the carry core, and a first embodiment of the shuttle-bucker means employed in the invention;

FIG. 2 is a fragmentary schematic diagram of the FIG. 1 first preferred embodiment of the octal adder of the invention except that a second and preferred embodiment of the shuttle-bucker means of the invention, wherein a single shuttle-bucker core is employed for all of the groups, is shown, and wherein the upper portion (not shown) of the fragmentary representation is identical to the embodiment of FIG. 1 including all of the FIG. 1 elements comprising cores, input lead windings, winding turns, and output lead windings; and FIG. 3 is a graphical diagram illustrating the changes in flux density plotted against the magnetizing force (current input) which produces it in switching of the cores and the flux change relationship involved where the noise canceling core; in performing its function of shuttling back and forth, eliminates noise and some false outputs possible under certain conditions if the noise canceling core were not employed.

Refer to the drawings and particularly to FIG. 1. The octal adder of the invention comprises 13 cores, C1, C2, C3, C4, C5, C6, C7, C8, C9, C10, C11, C12 and C13 (abbreviated hereinafter as C1–C13). Cores C1–C13 are electrically connected in parallel array. Each of the cores C1–C13 is appropriately labeled with the abbreviations S (set) and R (reset) to represent the flux density directions towards which each core C1–C13 is driven by current input (magnetizing force) fed into its input winding.

The windings (not identified by individual numerical or letter designations) on the cores C1–C13 are represented in mirror notation by the heavy lines which are drawn diagonally to the representations of the cores C1–C13. The lines which are drawn diagonally downward from a higher position on the right to a lower position on the left of the figures indicate windings wound in the clockwise (set or S) direction, and the diagonal lines which illustrate the windings wound in the counterclockwise (reset or R) direction are disposed from a higher position on the left diagonally to a lower position on the right.

The numerals printed adjacent to each of the windings (diagonal lines on the figures) denote the number of turns that each winding is wound on the respective cores. For example, in the rightmost core C13 (output therefrom labeled "*c*") the winding and the marking of "1" (shown by diagonal line from upper right down toward lower left and with numeral "1" adjacent) on the horizontal line leading from input $X_1$ at the position to the left of FIG. 1 denotes a winding of one turn wound in the clockwise direction (threading through such that input current is applied in the direction to set the core). On the next lowermost horizontal line (leading from input $X_2$ at the left) of the same rightmost core, the winding (running diagonally upward from left to right) denoted "2" indicates a two-turn winding also in the clockwise (set) direction.

Where there is no diagonal line (and no number), the lead is not threaded through or wound around the core. Where a lead is threaded through but not wound around a "leg" of a core C1–C13 the number 1 indicating one turn is marked. The higher numbers than "1" indicate the threading of the lead through a core plus the additional turns the lead is wound around a core leg. It is assumed that the clockwise direction is that where the winding is wound in a direction such that input will tend to cause the core to set. Then the counterclockwise winding is in the direction to tend to cause the core to reset.

Through the cores C1–C13 are threaded a plurality of input leads in parallel. These input leads are the leads $X_0$, $X_1$, $X_2$, $X_3$, $X_4$, $X_5$, $X_6$, $X_7$ and R in FIG. 1. The bias current is applied along the lead $X_0$. The reset current is applied along the lead R. The designation $N_1$, which groups input leads or windings $X_1$, $X_2$, and $X_3$, denotes the bits of the octal digit, or where a multidigit number one of a plurality of octal digits, of one of the octal numbers to be added (augend). The designation $N_2$ denotes the group of bits $X_4$, $X_5$ and $X_6$, which form the octal digit, or where a multidigit number the corresponding octal digit, of the number to be added to the first number (addend). An octal digit is expressed in terms of three binaries, e.g., $X_1$, $X_2$ and $X_3$, which gave the binary combinations 000, 001, 010, 011, 100, 101, 110 and 111 for the eight octal digits 0, 1, 2, 3, 4, 5, 6 and 7. The previous carry input current K is introduced into the previous octal digit carry lead $X_7$ input terminal. A previous carry (K) input is triggered upon a "one" appearing upon resetting of the next previous digit. For example, assume that to the $X_1$, $X_2$ and $X_3$ combination representing octal 3 (augend) is to be added the $X_4$, $X_5$ and $X_6$ combination representing octal 7 (addend). Then the respective inputs for the first number $N_1$ digit are $X_1=0$, $X_2=1$, $X_3=1$, and the respective inputs for the second number $N_2$ digit are $X_4=1$, $X_5=1$, and $X_6=1$. Upon addition of the octal digits 3 and 7 of the number $N_1$ and $N_2$, the least significant bit output $d_1$ is a 0, the next least significant bit output $d_2$ is a 1, the most significant bit output $d_3$ is a 0 and the carry output $c$ is a 1 (one). This $c$ carry output one may be coupled back to lead $X_7$ via a flip-flop (not illustrated) and the flip-flop (not illustrated) set so that whenever a "one" or carry results, upon resetting the carry core C13, a "one" appears correspondingly at K (carry) input lead $X_7$.

It should be understood that this described circuit is only illustrative of one mode of feeding back the previous carry. The inventive adder circuit is not intended to be restricted to this type of feedback of the previous carry input. For example, in applications such as occur upon going from most significant toward least significant digits, previous carries could be introduced in other modes and then either discarded or used depending upon requirements of the circuit.

The reset current to reset the circuit is applied into the lead winding R as designated by the word Reset which is printed adjacent that input terminal.

A total of thirteen cores C1–C13 are provided in the octal adder of the invention as illustrated in FIG. 1 and in FIG. 2. Each core C1–C13 has a plurality of windings wound upon it. For example, the leftmost, first core C1 has a one-turn input clockwise (in a direction such that the core is set when input current is applied) winding into which is fed current input along lead $X_1$. Lead $X_1$ carries the input current representing the first bit of one augend digit.

The core C1 also has one-turn counterclockwise (in a direction such that the core is reset when input current of required magnitude is applied) input windings into which are fed current inputs along leads $X_4$ and $X_7$ and has a one-turn, counterclockwise reset winding into which the reset current is fed. A one-turn clockwise output winding (all output windings are one-turn windings some being wound clockwise and some counterclockwise) also is threaded through the core C1. The fact that the output lead (lead L1 for example) is threaded through the core (core C1, for example) makes it the one-turn output winding referred to.

The output is taken from the cores C1–C13 in groups. The output from the first four leftmost cores, C1, C2, C3 and C4 comprises the least significant bit of the octal digit which digit is the sum of the previous carry and the corresponding input augend and addend octal digits. To obtain this least significant bit output cores C1, C2, C3 and C4 are ORed together by an output winding L1 threaded serially through the cores, the least significant bit output $d_1$ appearing across the output lead L1 terminals. The output from the second next leftmost group of four cores C5, C6, C7 and C8 comprises the second most significant bit of the octal sum digit of the corresponding input augend and addend digits. To obtain this second most significant bit output, cores C5, C6, C7 and C8 are ORed together by an output winding L2 threaded serially through those cores, the second most significant bit output $d_2$ appearing across the output lead L2 terminals. The output from the third rightmost group of four cores C9, C10, C11 and C12 comprises the most significant bit of the octal sum digit taken from the second most significant carry and the corresponding input augend and addend digits. To obtain this most significant bit output cores C9, C10, C11 and C12 are ORed together by an output winding L3 threaded serially through the cores. The most significant bit output $d_3$ appears across the output lead L3 terminals. The fourth group comprises a single rightmost carry core C13 through which the output lead L4 is threaded. The carry output $c$ appears across the terminals of the carry core output lead L4.

The cores are threshold devices and are wired in threshold configuration such that outputs are caused from the respective cores in accordance with the logical functions introduced.

The $c$ output of the rightmost core occurs in the event a carry results after adding the two octal digits $X_1$, $X_2$, $X_3$ of octal number $N_1$ and $X_4$, $X_5$, $X_6$ of octal number $N_2$.

Thus, the octal adder of the embodiment of FIG. 1 comprises thirteen cores, C1–C13 inclusive, connected in a type of parallel configuration. Each of said cores C1–C13 has a plurality of windings (not numbered). The number of turns of each (not numbered) winding is denoted by the numeral placed at the intersection of the cores and the windings which are threaded through and which may be further wound for additional turns upon cores C1–C13. A plurality of first, second, third, fourth, fifth, sixth and seventh input leads or current-carrying means $X_1$, $X_2$, $X_3$, $X_4$, $X_5$, $X_6$ and $X_7$ respectively are threaded through selected ones of said cores to provide said windings to enable applying appropriate input currents to the windings of the cores in accordance with the input digits and carry. The input leads or current-carrying means further comprise a bias current source input lead or bias current-carrying means $X_0$ from a source also herein designated $X_0$. A first group $N_1$ of said first, second and third input bit leads $X_1$, $X_2$, $X_3$ from the sources also herein designated $X_1$, $X_2$ and $X_3$, respectively, together represent the input augend octal digit. A second group $N_2$ of three input bit leads, said third, fourth and fifth leads $X_4$, $X_5$, $X_6$ from the sources also herein designated $X_4$, $X_5$ and $X_6$, respectively, together represent the input addend octal digit. A previous carry input bit lead, said lead $X_7$ from source K is provided and is triggered by a "one" appearing upon resetting of a previous digit. A reset input lead R into which current is applied at core reset time is strung through each of said thirteen cores C1–C13. Twelve of said thirteen cores comprise first, second and third groups of cores, cores C1, C2, C3 and C4; cores C5, C6, C7 and C8; and cores C9, C10, C11 and C12. Each group—cores C1–C4, cores C5–C8 and cores C9–C12—comprises four cores. A fourth group comprises a thirteenth core C13. Output lead L1 is connected serially through cores C1–C4 and ORs together the outputs of the four cores C1–C4 to provide output $d_1$. Output lead L2 is connected serially through cores C5–C8 and ORs together the output of the four cores C5, C6, C7 and C8 to provide output $d_2$. Output lead L3 is connected serially through cores C9, C10, C11 and C12 (C9–C12) and ORs together the output of cores C9–C12 to provide output $d_3$. Output lead L4 is threaded through the thirteenth core C13 to provide the octal carry function $c$. Each of said 13 cores C1–C13 has a one-turn reset winding wound in the counterclockwise direction whereby upon applying a reset pulse, the outputs $d_1$, $d_2$, $d_3$ are read out of the octal adder.

Each of the 13 cores C1–C13, in addition to reset and output windings, comprises a plurality of windings which are threaded therethrough and/or wound upon it by the input leads $X_0$, $X_1$, $X_2$, $X_3$, $X_4$, $X_5$, $X_6$ and $X_7$ as predetermined. Unless otherwise specified each winding referred to in this section is understood to be a one-turn, threaded-through winding and is a winding other than a reset or an output winding. Core C1 comprises first clockwise winding connected to said first octal number first binary bit of an octal digit input lead $X_1$, a second counterclockwise winding connected to said second octal number first binary bit of an octal digit input lead $X_4$ and a third counterclockwise winding responsive to said previous carry input lead $X_7$. Core C2 comprises two one-turn windings wound in the counterclockwise direction formed by threading therethrough said first octal number first bit input lead $X_1$ and said previous carry input lead $X_7$ and responsive respectively to current input applied to those input leads $X_1$ and $X_7$. Core C2 further comprises a one-turn clockwise winding formed by threading therethrough said second octal number first bit input lead $X_4$ and responsive to current input applied to the lead $X_4$. The third core C3 contains windings thereon comprising a first and a second counterclockwise winding along leads $X_1$ and $X_4$ and responsive to said first and second number first binary bits current input to leads $X_1$ and $X_4$ respectively and a clockwise winding along lead $X_7$ and responsive to said previous digit carry current applied to lead $X_7$. The windings on fourth core $C_4$ comprise a counterclockwise two-turn winding responsive to said bias current input to bias lead $X_0$, and three clockwise one-turn windings responsive respectively to said first number $N_1$ first binary bit input to lead $X_1$, said second number $N_2$ first binary bit input to lead $X_4$ and said previous carry K input to lead $X_7$. The first four cores C1–C4 are ORed together by the output lead L1 being threaded serially through these cores C1–C4 to form one-turn windings thereon and terminals are formed at the ends of lead L1 such that upon resetting cores C1–C4 there is provided across these terminals a first bit of octal digit sum output $d_1$.

The windings on the fifth core C5 comprise a one-turn counterclockwise winding of lead $X_1$ threaded therethrough and responsive to said first octal digit $N_1$ first binary bit current input to lead $X_1$, a two-turn clockwise winding of lead $X_2$ and responsive to said first octal digit $N_1$ second binary bit current input to lead $X_2$, a one-turn counterclockwise winding of lead $X_4$ responsive to said second octal digit $N_2$ first binary bit current input to lead $X_4$, a two-turn counterclockwise winding of lead $X_5$ and responsive to said second octal digit $N_2$ second binary bit input to lead $X_5$ and a counterclockwise, one-turn winding of lead $X_7$ responsive to the previous carry input to lead $X_7$. The windings on the sixth core C6 comprise a one-turn counterclockwise winding of lead $X_0$ responsive to said bias input to lead $X_0$, a one-turn clockwise winding of lead $X_1$ responsive to said first octal digit first binary bit current input to lead $X_1$, a two-turn counterclockwise winding of lead $X_2$ responsive to said first octal digit $N_1$ second binary bit current input to lead $X_2$, a one-turn clockwise winding of lead $X_4$ responsive to said second octal digit $N_2$ first binary bit current input to lead $X_4$, a two-turn counterclockwise winding of lead $X_5$ responsive to said second octal digit $N_2$ second binary bit current input to lead $X_5$ and a one-turn clockwise winding of lead $X_7$ responsive to said previous carry K current input to lead $X_7$. The windings on the seventh core C7 comprise a first counterclockwise one-turn winding of lead $X_1$ responsive to said first octal digit $N_1$ first binary bit current input to lead $X_1$, a second two-turn counterclockwise winding of lead $X_2$ responsive to said first octal digit $N_1$ second binary bit current input to lead $X_2$, a third one-turn counterclockwise winding of lead $X_4$ responsive to said second octal digit $N_2$, first binary bit current input to lead $X_4$, a fourth two-turn clockwise winding of lead $X_5$ responsive to the second digit $N_2$ second bit current input to lead $X_5$, a fifth one-turn counterclockwise winding of lead $X_7$ responsive to said previous carry input current K to lead $X_7$. The windings on the eighth core C8 comprise a five-turn counterclockwise winding of lead $X_0$ responsive to the bias input current to lead $X_0$, one- and two-turn clockwise windings of leads $X_1$ and $X_2$ respectively connected to the augend octal digit $N_1$, first and second binary bits current inputs to respective leads $X_1$ and $X_2$, one- and two-turn clockwise windings of leads $X_4$ and $X_5$ respectively connected to the addend octal digit $N_2$ first and second binary bits current inputs to respective leads $X_4$ and $X_5$, and a one-turn clockwise winding due to threading of lead $X_7$ through core C8 to render it responsive to said previous carry input K to lead $X_7$. The windings on the ninth core C9 comprise a one-turn counterclockwise winding and a two-turn counterclockwise winding respectively connected from the leads $X_1$ and $X_2$ and also from the leads $X_4$ and $X_5$ which carry the respective augend octal number $N_1$ first and second binary bits current inputs on leads $X_1$ and $X_2$ and also the respective addend octal number $N_2$ first and second binary bits current inputs on leads $X_4$ and $X_5$, a four-turn clockwise winding from each of leads $X_3$ and $X_6$ and respectively responsive to the augend octal digit $N_1$ third binary bit current input to lead $X_3$, and to the addend octal digit $N_2$ third binary bit current input to lead $X_6$, and a one-turn counterclockwise winding connected from lead $X_7$ on which is sent the previous carry input K along lead $X_7$. The windings on the tenth core C10 comprise three-turn counterclockwise, one-turn clockwise, two-turn clockwise and four-turn counterclockwise windings connected respectively from leads $X_0$, $X_1$, $X_2$ and $X_3$ and responsive respectively to current input from said bias $X_0$ and from the current sources representing said first, second and third binary bits $X_1$, $X_2$ and $X_3$ of said first octal digit $N_1$, one-turn clockwise, two-turn clockwise and four-turn counterclockwise windings connected respectively from leads $X_4$, $X_5$ and $X_6$ and responsive respectively to current input from sources representing said second octal number first, second and third binary bits to respective leads $X_4$, $X_5$ and $X_6$; and a one-turn clockwise winding connected from lead $X_7$ and responsive to said previous carry input K to lead $X_7$. The windings on the eleventh core C11 comprise one- and two-turn counterclockwise windings respectively connected to input leads $X_1$ and $X_2$ and also respectively to input leads $X_4$ and $X_5$ which carry the currents representing said augend octal number $N_1$ first and second binary bits current inputs to lead $X_1$ and $X_2$ and also said addend octal number $N_2$ first and second binary bits current inputs to leads $X_4$ and $X_5$, a four-turn counterclockwise winding of lead $X_3$ and responsive to current input to lead $X_3$ representing the third binary bit $X_3$ of an octal digit of augend octal number $N_1$, a four-turn clockwise winding of lead $X_6$ and responsive to the current input to lead $X_6$ representing the third bit of the corresponding octal digit of addend octal number $N_2$ and a one-turn counterclockwise winding responsive to the previous carry current input K to previous carry lead $X_7$. The windings on the twelfth core C12 comprise an eleven-turn counterclockwise winding of lead $X_0$ and responsive to the bias current input to lead $X_0$, one-turn and four-turn clockwise windings respectively connected to the leads $X_1$, $X_2$ and $X_3$ and also respectively connected to leads $X_4$, $X_5$ and $X_6$ respectively responsive to current inputs representing first and second corresponding digits of augend and addend octal number $N_1$ and $N_2$ first, second and third respective binary bits applied respectively to leads $X_1$, $X_2$ and $X_3$ in the case of octal number $N_1$ and also respectively applied to leads $X_4$, $X_5$ and $X_6$ in the case of octal number $N_2$ and a one-turn clockwise winding of lead $X_7$ and responsive to said previous carry current input K to lead $X_7$. The windings on the thirteenth carry core C13 comprise a seven-turn clockwise winding connected and coupled via bias lead $X_0$ and responsive to the bias input current to lead $X_0$, one-, two- and four-turn clockwise windings respectively connected and coupled in via leads $X_1$, $X_2$ and $X_3$ and also via leads $X_4$, $X_5$ and $X_6$ and responsive to current inputs to these leads representing corresponding octal digits of respectively the augend and addend numbers octal digits $N_1$ and $N_2$, first, second and third binary bit inputs $X_1$, $X_2$ and $X_3$ and also $X_4$, $X_5$ and $X_6$ and a one-turn clockwise winding responsive to the previous carry current input K to lead $X_7$.

As hereinbefore indicated, the windings of each core of cores C1–C13 further comprises a one-turn counterclockwise winding due to the counterclockwise threading through it of the reset lead R and responsive to the reset current input to lead R. The windings of each of the cores C1–C13 further comprises a clockwise output winding formed by linking with a common series output winding the cores of each group of group of cores 1–4, group of cores 5–8, group of cores 9–12 and threading a clockwise output winding through carry core C13.

By linking the cores of each group with a common series output winding, cores C1, C2, C3 and C4 are ORed together by output lead L1 to form a first group of cores to provide least significant bit output $d_1$, cores C5, C6, C7 and C8 are ORed together by output lead L2 to form a second group of cores to provide next least significant bit output $d_2$, cores C9, C10, C11 and C12 are ORed together by output lead L4 to form a third group of cores to provide most significant bit output $d_3$ and output lead L4 is threaded through core C13 to provide the carry output $c$ across the terminals of lead L4. In the FIG. 2 preferred embodiment corresponding common series output windings L1', L2', L3' similarly OR the respective core group C1–C4, C5–C8, and C9–C12 together and output lead L4 similarly threads core C13 to provide the carry output.

Thus, in the circuits of FIGS. 1 and 2, the groups of cores are driven by constant current pulses applied at the $X_0$–$X_7$ inputs and the reset input R. The circuits of lead $X_0$–$X_7$ and R are completed from the terminals shown at the right of FIG. 1 back to the input terminals of leads $X_0$–$X_7$ and R via the sources of constant current pulses.

At most, only one core in each of the thre groups of cores C1–C4, C5–C8, C9–C12 plus the carry core, where there is a carry present, in the 13-core solution presented by FIGS. 1 and 2 will switch for a given input combination. That is, for any combination of bias input and input from current sources applied to the leads $X_1$ to $X_7$ representing two octal digits to be added together and the carry where present, at most only one of cores C1, C2, and C4, and at most only one of the cores C5, C6, C7 and C8 and at most only one of cores C9, C10, C11 and C12 will switch for each combination. Core 13 will switch when a carry results. In the 13-core octal adder described, the one core where it does switch is reset during read time and the other three cores in each group are driven further into saturation. Where none of the cores of each of the four-core groups is switched for a given input combination, all four cores of that group are driven further into saturation during read or reset time.

Refer to FIG. 3 of the drawings. FIG. 3 provides a graphical plot of flux density $\phi$ versus the magnetizing force (current I times number of turns N). The direction of the flux $\phi$ increase in the set direction with increase of current in the set direction (→SET) is symbolized by ↑S and the flux $\phi$ change toward the reset direction for current change in the reset direction (RESET←) is symbolized by R in FIG. 3. The shuttle voltages of the cores of each of the groups are additive and result in an undesirable noise pulse. The total shuttle flux is denoted by $\phi s$. The shuttle flux $\phi s$ corresponds to a voltage which is equal to $$N\frac{d\phi s}{dt}$$

where N is the number of winding turns. The shuttle voltage ($d\phi s/dt$) of each of the cores results in an undesirable noise pulse. These unwanted voltages in any group may be as high as $$4\frac{d\phi}{dt}$$

since a total of one reset winding for each of the cores, or a total of four windings, ($N=4$) is involved.

Since upon resetting to obtain output at most only one of the cores of any group of four will be reset and hence will not be giving the undesired shuttle noise pulse, a minimum undesirable voltage output of $$3\frac{d\phi s}{dt}$$

will always be present for each reset. In order to compensate for this undesirable noise, a noise canceling core is introduced. In the embodiment illustrated in FIG. 1, a separate noise canceling core is employed for each of the groups, noise canceling core S1 for group of cores C1, C2, C3 and C4; noise canceling core S2 for group of cores C5, C6, C7 and C8; and noise canceling core S3 for group of cores C9, C10, C11 and C12. A noise canceling core is not provided for carry core C13 since the voltage of $d\phi s/dt$ from at most one core alone, when reset current is applied, is relatively negligible and will not cause a false output reading to result. Each of the noise canceling cores S1, S2 and S3 in FIG. 1 has two windings: a one-turn reset winding and a second 3-turn winding which is threaded through and wound upon the noise canceling core S1, S2 or S3 in the direction contra to the direction that the output winding of its group is threaded (wound) through its group of cores. In this FIG. 1 embodiment there are three turns for each noise canceling core winding S1, S2 and S3 which are in the direction opposed to the four opposite direction output turns of the cores C1–C4, C5–C8 or C9–C12 of any one group. For example, noise canceling core S1 has a winding of three turns in the counterclockwise direction whereas the four opposed output windings ane for each of the cores C1, C2, C3 and C4 on output lead S1 causes the noise voltage $d\phi s/dt$ to appear in the clockwise direction. Thus, three of the four noise voltage output $d\phi s/dt$ which occur upon reset are always canceled out and the fourth one where present generates less than the a mount of noise which would lead to a false output result. The square loop designation of FIG. 3 is characteristic of the material and shape which any of the 13 cores of the embodiment of either FIG. 1 or FIG. 2 are preferably made and the noise canceling core is also preferably made of the same material and shape so as to present the same square loop characteristics. This solution of providing an auxiliary core with appropriate windings called the noise canceling core is a superior means for canceling unwanted noise and eliminating danger of false readings since this means eliminates the requirement that the sensing or read circuitry be designed to handle bipolar signals.

Thus, the noise canceling core of FIG. 1, for example, comprises a core on which an output winding is placed with a number of turns (or one less than the number of turns) equal to the number of cores (four cores) used to mechanize one bit of the digit of the function multiplied by the number of turns on each output winding of the function core (one output turn per core). The output winding of the noise canceling core is connected in series with the other output windings but in opposite polarity. The lead is threaded through and therefore a reset winding is utilized for each of the noise canceling cores in order to shuttle the noise canceling core just as the reset pulse tends to reset the other cores of each of the groups. At reset time the shuttle core which is at reset remanence is driven further in the reset direction by the reset winding. This causes the shuttle flux since this is the reset input. Since no variables are applied to the noise canceling core, but only the reset voltage, it never switches but simply shuttles. The larger number of turns on this shuttle core plus its polarity serves to cancel the collective shuttle voltage of the logic cores.

Refer to FIG. 2. This embodiment is identical to the embodiment of FIG. 1 shown, except that instead of the noise canceling cores S1, S2 and S3 and their windings for the respective groups of four cores C1–C4, C5–C8 and C9–C12, one single shuttle-bucker S4 with three separate three-turn windings connected via each output lead L1', L2' and L3' and with a one-turn reset winding provided by threading the reset lead therethrough is provided. Shuttle-bucker S4 replaces the three noise canceling cores S1, S2 and S3 of FIG. 1 and takes care of neutralizing the effects of the noise voltage $d\phi s/dt$ of all of the three groups of cores, cores C1, C2, C3 and C4; cores C5, C6, C7 and C8 and cores C9, C10, C11 and C12. Noise canceling auxiliary core S4 and its windings operates under similar theoretical principles and behaves physically in similar fashion to the operation of noise canceling cores S1, S2 and S3 in the FIG. 1 embodiment. Unnecessary repetition in explanation of theory and operation is hence not made. The FIG. 2 embodiment possesses the advantage that only a single shuttle core is required and hence is preferred.

There thereby is provided an optimum circuit utilizing a minimum amount of cores to perform the functions of an octal adder and wherein excellent noise cancellation is obtained by the use of an auxiliary noise canceling core means having a number of turns on this core of a polarity so as to cancel the collective unwanted shuttle voltage noise of the logic cores.

The octal adder of the invention demonstrates the practibility of the linking of a plurality of cores with a common series output winding when more than one core is required for the embodiment of the function. In it is provided an input composite for a threshold device such as a magnetic core which enables an optimized circuit for realizing the function. The inventive circuit is constructed to avoid the indescribable noise which results in circuits wherein flux cancellation is required. In the circuit of the invention not more than one core of a multiple core function may switch for any input combination and this results in very good signal ratios. Furthermore, in the device of this invention, the polarity requirements of the output winding becomes trivial.

An octal adder providing these advantages may be designed using a "variable suppression method." This method enables the synthesis of $n$ variable functions in terms of known solutions of functions of fewer variables which may not be optimal but which may be automized readily. The octal adder requires seven inputs, three for each of the augend and addend octal digits and one for the carry. There are four outputs, three for the actual sum and one for the carry. By employing the variable suppression method seven variable functions may be broken down by artificially making three variable functions independent of the other four variables. With such a method an octal adder may be provided using 28 cores to form the function of each significant bit of the sum. This adder requires 85 cores (28 for each significant bit or 28 times 3 equals 84 and one for the carry, equals 85). However, by considering symmetries of the function and utilizing a profile technique the circuitry of the invention is provided wherein a total of only 13 cores are required.

It will be understood of course, that the thirteen core embodiments comprises the three groups of four function cores each and the thirteenth (carry) core and that the shuttle-bucker presents an added feature of the invention which sometimes may be dispensed with optionally such as in cases as where noise is not of importance or where greater economy is desired and some noise may be tolerated.

By considerations of symmetry and employing the profile technique there is obtained the following equations, for example, of cores C9, C10, C11 and C12 which may be interpreted and mechanized to present the structure of FIGS. 1 and 2. Expressed in the equation notation the solutions are as follows:

$$C9 = -X_1 - 2X_2 + 4X_4 - X_8 - 2X_{16} + 4X_{98} - X_{64}$$
$$C10 = -3X_\phi + X_1 + 2X_2 - 4X_4 + X_8 + 2X_{16} - 4X_{32} + X_{64}$$
$$C11 = -X_1 - 2X_2 - 4X_4 - X_8 - 2X_{16} + 4X_{32} - X_{64}$$
$$C12 = -11X_\phi + X_1 + 2X_2 + 4X_4 + X_8 + 2X_{16} + X_{64}$$

Refer again to FIGS. 1 and 2. In utilizing the above notation, $X_\phi$ of the equations refer to the windings threaded and wound on the cores from the bias input lead $X_0$ and the coefficients of the X's, $X_1$ etc. in the equations are the number of turns (the numeral adjacent the corresponding windings in FIG. 1). In the equations the X notations correspond to the input leads and windings as follows: For augend number $N_1$, addend number $N_2$, and carry input K;$X_1$ (windings of FIGS. 1 and 2 embodiments)$=X_1$ (above equations), $X_2$ (windings)$=X_2$ (equations), $X_3$ (windings)$=X_4$ (equations), $X_4$ (windings)$=X_8$ (equations), $X_5$ (windings)$=X_{16}$ (equations), $X_6$ (windings)$=X_{32}$ (equations), and $X_7$ (K input carry windings)$=X_{64}$ (equations).

In this transformation it is readily seen how the equations hereinabove listed for cores C9, C10, C11 and C12 correspond to the structural configuration of cores and windings shown for cores C9, C10, C11 and C12 in FIG. 1 of the diagram.

In considering symmetry and obtaining equations as above for the cores the input composite of the threshold device is analyzed. Successive values of the input composite are considered under all possible combinations of "ones" and "zeros" of the seven ($n$) variables arranged as increasing seven-digit binary numbers. The resulting truth-table is considered a matrix operator multiplying the solution vector to give a $2^7$ term input composite vector. To conform the order of the variables in the solution, the column order of the truth matrix is reversed. The logic function is evaluated by applying the threshold conditions to the input composite vector. The function is classified according to self-consistent groups of "ones," that is, the "one" bits of the seven-variable function is classified into self-consistent sets following which development of the device of the invention is effected either utilizing the simplex method for the solution of consistent inequalities, or studying the input composite profile in a hand performed method or both.

In the present instance the truth function to be solved is rewritten representing each span of four bits treated as a binary number by the equivalent decimal number. The spans are classified into consistent groups. For convenience the function is divided into quarters. Pairs of spans are examined for consistency and all of the "one" bits of the function are classified in four groups according to their consistency with one another. Transformations are used to move all possible ones to the least significant bit end of the function (invert entire function, complement the variable $X_n$, interchange $X_m$ and $X_n$, suppress the variable $X_n$ by making its input value equal minus the most positive combination of input values of the other variables and the bias. Permutating $X_6$ and $X_7$ and suppressing $X_7$ brings all of the ones to the upper half of the function. The second half is then dropped.

The reduced and transformed function has a solution. Applying the same set of transformations in reverse order transforms this solution to the desired one. Thus successively invert the function, suppress $X_6$, permute $X_3$ and $X_6$, suppress $X_7$, permute $X_6$ and $X_7$ gives the final solution for core C10. The solutions for cores C9, C11 and C12 are found similarly and in each case the matrix may be expressed in the above equation notation. The reduction of 28 cores to 4 cores is similarly effected for the other two significant bits to provide the adder of FIGS. 1 and 2.

While a specific embodiment of the invention has been shown and described, it should be recognized that the invention should not be limited thereto. It is accordingly intended in the appended claims to claim all such variations as fall within the true scope of the invention.

What is claimed is:

1. An octal adder comprising:

(a) three groups of function cores, each said group having four function cores, (b) a common output lead threaded through each of the four cores of each of said groups to form core windings and to link the outputs of the four cores of each said group, each said group comprising a one-significant-sum bit output means such that the three groups together provide an octal digit output comprising three significant sum bits, said function cores forming a temporary output register capable of emptying their contents into a shift register for accumulating the octal digits to provide the sum of two octal numbers, said output common core linking leads and their windings having sets of terminals and being connected to provide an output from each link terminal set such that the link lead and windings for each group of four cores provides connections of each of the cores to each other in series arrangement and the three groups present simultaneous output in a parallel array, (c) a carry output core means for providing a carry into the input of the adder to enable summing a next more significant octal digit, (d) input means connecting bit currents representing the input octal digits of an augend and an addend number to be added into predetermined cores of said function and carry cores in parallel array, (e) said carry output core having an output lead with terminals to present its output simultaneously and in parallel with the output of said groups of function cores.

2. The apparatus of claim 1 including at least one shuttle voltage noise cancelling core connected to said function cores, and wherein said input means further comprise means to introduce carry of a previous octal digit sum where said previous digit sum carry is present, bias input means to provide a bias current to predetermined cores of said function cores and to said carry core and a reset input means linked through each of said shuttle, function and carry cores to reset said shuttle core, said function cores and said carry core.

3. The apparatus of claim 2 wherein said groups of four cores which comprise said one-significant-sum bit output means comprise a first group to provide the least significant bit of said octal number sum in its output lead, a second group of four cores to provide the next more significant bit of said octal number sum in its output lead and the third group of four cores to provide the most significant bit of said octal number sum in its output lead, said three groups thereby comprising the three significant bits necessary to form an octal number representing the sum of two octal digit inputs, said carry core providing in its output lead the carry current to be introduced with the input currents representing the bits and bias current for a next more significant pair of octal digits to be added, the cores of said first group, said second group and said third group and said carry core having windings thereon of turns and in predetermined relationship such that feeding of any two input octal digits into the input means of said groups of cores provides an output in said core group and carry output leads which represents the sum of said input digits plus the carry input.

4. The apparatus of claim 3 wherein each of said groups of four function cores comprises first, second, third and fourth cores, and wherein in said least significant bit group the windings of the first core comprise a one-turn winding wound in the clockwise direction for the first input bit of said augend input octal digits, a one-turn counterclockwise winding for the corresponding first input bit of said addend octal digit and a one-turn counterclockwise winding from said previous carry input, said second core windings comprise a one-turn counter-clockwise winding for said first input bit of said first augend digit, a one-turn clockwise winding in the corresponding bit of said addend digit and a one-turn counterclockwise previous carry input winding, said third core windings comprise a one-turn counterclockwise winding in each of the first bits of each of said augend and addend input octal digits and a one-turn clockwise previous carry input winding and said fourth core windings comprise a two-turn counterclockwise winding responsive to the bias input, a one-turn clockwise winding for each of the first input bits of each of said augend and addend digits and a one-turn clockwise previous carry input winding.

5. The apparatus of claim 4 wherein in said second most significant bit group the windings of the first core comprise a one-turn counterclockwise winding for the first input bit of each of said augend and addend octal digits, a two-turn clockwise winding for the second augend octal digit bit, a two-turn counterclockwise winding for the second addend octal digit bit and a one-turn counterclockwise previous carry input winding; the windings of the second core comprise a one-turn counterclockwise winding responsive to said bias input, respective one-turn clockwise and two-turn counterclockwise windings for the respective first and second input bits of each of the augend and added octal digits, and a one-turn clockwise previous carry input winding, the windings of the third core comprise one-turn counterclockwise windings for each of said first input bit augend and addend octal digits and for said previous carry input; a two-turn-counterclockwise winding for the second input bit of said augend octal digit and a two-turn clockwise winding for the second input bit of said addend octal digit; the windings of the fourth core comprise a five-turn counterclockwise winding responsive to said bias input, respective one-turn and two-turn clockwise windings for the respective first and second input bits of each of the augend and addend octal digits and a one-turn clockwise previous carry input winding; and wherein in said most significant bit group the windings of said first core comprise respective one-turn and two-turn counterclockwise and four-turn clockwise windings for the respective first, second and third input bits of each of said augend and addend octal digits and a one-turn counterclockwise previous carry input winding; the windings of the second core comprise a three-turn counterclockwise winding responsive to said bias input, respective one-turn and two-turn clockwise and four-turn counterclockwise windings for the respective first, second and third input bits of each of said augend and addend octal digits and a one-turn clockwise previous carry input winding; the windings of the third core comprise respective one-turn and two-turn counterclockwise windings for the respective first and second input bits of each of said augend and addend octal digits, a four-turn counterclockwise winding for the third input bit of the augend octal digit, a four-turn clockwise winding for the third input bit of the addend octal digit and a one-turn counterclockwise previous carry input winding; the windings of the fourth core comprise an eleven-turn counterclockwise winding responsive to said bias input, respective one-turn, two-turn and four-turn clockwise windings for the respective first, second and third input bits of the augend and the addend octal digits and a one-turn clockwise previous carry input winding; and the windings of the carry core comprise a seven-turn clockwise winding responsive to said bias input, respective one-turn, two-turn and four-turn clockwise windings for the respective first, second and third input bits of the augend and the addend octal digits and a one-turn clockwise previous carry winding.

6. An octal adder for adding successive inputs of first and second octal digits of two octal numbers, each said first and second octal digit comprising three binary bits, to provide an output octal digit sum and a carry where such carry results from summing the first and second octal digit inputs, said octal adder comprising:

(a) a most significant bit, a next most significant bit, and a least significant bit group of cores, (b) each of said significant bit groups of cores comprising a first, second, third and fourth core, (c) a carry core, (d) said cores of said significant bit groups comprising function cores and together with said carry core comprising means respectively to receive inputs representative of the bits of two corresponding octal input digits to be added together and of the previous carry and to provide outputs representative of the bits of the octal digit output resulting from adding the two corresponding input octal digits and the carry where present, (e) said inputs comprising first, second and third input current carrying means responsive to input currents when said input currents are present and not present selectively in accordance with the value of each of the bits of said first input octal digit, (f) said inputs further comprising fourth, fifth and sixth input current carrying means responsive to input currents when said input currents are present and not present selectively in accordance with the value of each of the bits of said second input octal digit to be added to the first octal digit, (g) said inputs further comprising a seventh input circuit carrying means responsive to carry input where present in the sum resulting from adding the next previous corresponding digits of said octal numbers, (h) a respective most significant, next most significant and least significant bit output lead threaded in series arrangement through said first, second, third and fourth core of respective most, next most and least significant bit groups to provide a parallel octal digit output from said most, next most and least significant bit groups of cores corresponding to the instantaneous state of each of said groups of cores, (i) a carry output lead threaded through said carry core to present the output carry of the digits added in said function cores upon, therein introducing corresponding input currents to said first, second, third, fourth, fifth, sixth and seventh input means, where an output carry is present, in parallel arrangement with said three significant bit outputs presented by the octal output leads, (j) each of said first, second, third and fourth cores in each of said most significant, next most significant and least significant bit groups and said carry core being selectively threaded and unthreaded by said input windings, and where threaded, said cores being provided with a number of windings such as to provide an output from said parallel output means corresponding to the output digit sum upon adding the digit and carry inputs.

7. The apparatus of claim 6, said inputs further comprising a bias current carrying input lead threaded through at least one core of each of said groups of four cores corresponding to the most significant, next most significant, and least significant bit core and threaded through said carry core and wound a number of turns in each of said cores through which said bias input means is threaded in accordance with a bias input which in conjunction with said inputs representative of the bits of each of said octal digits and of said carry to be added enables an output corresponding to the sum of said input octal digits to appear at said respective most significant, next most significant and least significant bit output leads and at said carry lead.

8. The apparatus of claim 7 wherein:

(a) said least significant bit group first core windings comprise a one-turn winding in the set direction threaded therein from the input lead of the first bit of said first input octal number digit and one-turn windings in the counterclockwise reset direction threaded therein from the input lead of the first bit of said second octal number digit input means and from said next previous digit carry input lead, (b) said least significant bit group second core windings comprises a two-turn counterclockwise winding threaded therein from said first digit, first bit input means and from said previous digit carry input means and a clockwise one-turn winding threaded therein from said second input digit first bit input means, (c) said least significant bit group third core windings comprise counterclockwise one-in turn windings threaded therein from the input leads of the first bit of each of said first and second input octal number digits and a clockwise one-turn winding threaded therein from said next previous stage carry input means, (d) said least significant bit group fourth core windings comprises a two-turn counterclockwise winding threaded therein from said bias source input lead, one-turn clockwise windings threaded therein from the input lead means of the first bit of each of said first and second input octal number digits and from said next previous stage carry input means, (e) said next most significant bit group first core windings comprise one-turn, counterclockwise windings threaded therein from said input leads of said first input octal number digit first bit and said second input octal number digit first bit and said carry input means and a two-turn clockwise winding threaded therein from said first input octal number digit second bit input means and a two-turn counterclockwise winding from said second input octal number digit second bit input means, (f) said next most significant bit group second core windings comprise a one-turn counterclockwise winding threaded therein from said bias source input lead, one-turn clockwise windings from said first and second octal number digit first bit input means and from said carry input means and two-turns counterclockwise windings from said first and second octal number digit second bit input means, (g) said next most significant bit group third core windings comprise one-turn counterclockwise windings threaded therein from said first and second octal number digit first bit input means and from said carry input means, a two-turn clockwise winding from said first octal number digit second bit input means, and a two-turn clockwise winding from said second octal number digit second bit input means, (h) said next most significant bit group fourth core windings comprise a five-turn counterclockwise winding threaded therein from said bias source input lead, one-turn clockwise windings from each of said first and second octal number digits first bit input means and said carry input means and two-turn clockwise windings from said first and second octal number digit second bit input means, (i) said most significant group first core windings comprise one-turn counterclockwise windings threaded therein from each of said first and second octal number digit first bit input means and from said carry input means, two-turn counterclockwise windings from each of said first and second octal number digits second bit input means, and four-turn clockwise windings from each of said first and second octal number digit third bit input means, (j) said most significant group second core windings comprise a three-turn counterclockwise winding threaded therein from said bias source lead, one-turn clockwise windings from each of said first and second octal number digit first bit input means and from said carry input means, two-turn clockwise input windings from each of said first and second octal number digit second bit input means, and four-turn counterclockwise windings from each of said first and second octal number digit third bit input means, (k) said most significant group third core windings comprise respective one-turn, two-turn and four-turn counterclockwise windings respectively threaded therein from said first octal number digit first, second and third bit input means, respective counterclockwise one-turn, two-turn and four-turn clockwise windings from respectively said second octal number digit first, second and third bit input means, and a counterclockwise one-turn winding from said carry input means, (l) said most significant group fourth core windings comprise an eleven-turn counterclockwise winding threaded therein from said bias source input lead, respective one-turn, two-turn and four-turn clockwise windings from each of respectively said first, second and third bit input means of both said first octal number digit and also said second octal number digit and a one-turn clockwise winding from said input carry means, (m) and wherein said carry core windings comprise respective seven-turn, one-turn, two-turn, four-turn, one-turn, two-turn, four-turn and one-turn clockwise windings respectively from said bias source input lead, said first octal number digit first, second and third bit input means, said second octal number digit first, second and third bit input means and said carry input means, and circuit means whereby the carry core output where present is applied to the next digit carry input.

References Cited

UNITED STATES PATENTS

| | | | |
|---|---|---|---|
| 3,115,619 | 12/1963 | Barrett et al. | 340—174 |
| 3,149,313 | 9/1964 | Merz et al. | 340—174 |
| 3,185,826 | 5/1965 | Andrews | 235—175 |
| 3,222,645 | 12/1965 | Davis | 340—146.2 |

MALCOLM A. MORRISON, *Primary Examiner.*

V. SIBER, *Assistant Examiner.*

UNITED STATES PATENT OFFICE
CERTIFICATE OF CORRECTION

Patent No. 3,351,747 November 7, 1967

Oscar B. Stram et al.

It is hereby certified that error appears in the above numbered patent requiring correction and that the said Letters Patent should read as corrected below.

Column 1, line 62, for "strong" read -- strung --; column 9, line 18, for "thre" read -- three --; column 10, line 17, for "ane" read -- one --; column 11, line 44, for "embodiments" read -- embodiment --; line 57, for "$4X_{98}$" read -- $4X_{32}$ --; column 14, line 7, for "added" read -- addend --; column 15, line 37, after "output" insert -- octal --; line 63, for "comprises a two-turn" read -- comprise one-turn --; line 63, for "winding" read -- windings --; same column 15, line 69, for "one-in turn" read -- one-turn --.

Signed and sealed this 3rd day of December 1968.

(SEAL)
Attest:

EDWARD M.FLETCHER,JR.
Attesting Officer

EDWARD J. BRENNER
Commissioner of Patents